US010488287B2

(12) United States Patent
Vellaisamy et al.

(10) Patent No.: US 10,488,287 B2
(45) Date of Patent: Nov. 26, 2019

(54) ELECTRIC DEVICE FOR DETECTING PRESSURE

(71) Applicant: City University of Hong Kong, Kowloon (HK)

(72) Inventors: A. L. Roy Vellaisamy, Kowloon (HK); Qijun Sun, Kowloon (HK); Jiaqing Zhuang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 63 days.

(21) Appl. No.: 15/944,205

(22) Filed: Apr. 3, 2018

(65) Prior Publication Data

US 2018/0224345 A1    Aug. 9, 2018

Related U.S. Application Data

(63) Continuation of application No. 15/091,876, filed on Apr. 6, 2016, now Pat. No. 10,054,507.

(51) Int. Cl.
*G01L 9/00* (2006.01)
*G01L 9/02* (2006.01)
*G01L 9/12* (2006.01)
*H01L 29/84* (2006.01)

(52) U.S. Cl.
CPC .......... *G01L 9/0072* (2013.01); *G01L 9/0051* (2013.01); *G01L 9/0098* (2013.01)

(58) Field of Classification Search
CPC ....... G01L 9/00; G01L 9/0051; G01L 9/0072; G01L 9/02; G01L 9/12; H01L 29/84
See application file for complete search history.

(56) References Cited

U.S. PATENT DOCUMENTS

| | | | | |
|---|---|---|---|---|
| 3,351,786 A | * | 11/1967 | Muller | G01H 11/08 |
| | | | | 310/319 |
| 3,440,873 A | * | 4/1969 | Eichelberger | G01L 1/18 |
| | | | | 73/862.68 |
| 3,893,228 A | | 7/1975 | George | |
| 4,730,496 A | | 3/1988 | Knecht | |
| 4,893,156 A | * | 1/1990 | Karasawa | H01L 29/84 |
| | | | | 257/401 |
| 4,894,698 A | | 1/1990 | Hijikigawa | |
| 6,221,024 B1 | | 4/2001 | Miesel | |
| 8,635,919 B2 | | 1/2014 | Suzuki | |
| 8,752,436 B2 | | 6/2014 | Beck | |
| 9,945,765 B2 | * | 4/2018 | White | G01N 27/4141 |
| 2016/0377492 A1 | * | 12/2016 | Lee | G01L 5/228 |
| | | | | 73/862.626 |

FOREIGN PATENT DOCUMENTS

| | | | | |
|---|---|---|---|---|
| DE | 4031369 | | 4/1992 | |
| JP | 58164271 A | * | 9/1983 | H01L 29/84 |
| JP | 58171865 A | * | 10/1983 | H01L 29/84 |
| JP | 2014115099 A | * | 6/2014 | G01L 9/00 |

* cited by examiner

*Primary Examiner* — Nguyen Q. Ha
(74) *Attorney, Agent, or Firm* — Renner Kenner Greive Bobak Taylor & Weber

(57) ABSTRACT

An electric device for detecting pressure and a pressure sensor includes an electric current channel arranged to conduct an electric current, wherein the electric current channel is disposed adjacent or proximate to a pressure sensitive structure. Upon the pressure sensitive structure being subjected to a change of an external pressure, the pressure sensitive structure is arranged to manipulate a first electrical characteristic of the electric current channel.

23 Claims, 4 Drawing Sheets

ELECTRIC DEVICE FOR DETECTING PRESSURE

CROSS-REFERENCE TO RELATED APPLICATIONS

This application is a Continuation of U.S. patent application Ser. No. 15/091,876, filed Apr. 6, 2016, and incorporated herein by reference in its entirety.

TECHNICAL FIELD

The present invention relates to an electric device for detecting pressure and a method for fabricating the electric device, although not exclusively, to a pressure sensor fabricated using simple and low-cost fabrication technologies.

BACKGROUND

Pressure sensors may be used to measure pressure, such as an air pressure in the atmosphere or a fluid pressure in a water tank. In an electric pressure sensor, the sensor may act as a transducer that generates an electric signal as a function of the pressure imposed.

For example, a pressure sensor may be further implemented as a component of a barometer that may be used to measure the atmospheric pressure. Such information may be useful for estimating an amount of certain target components in air exist in a desired location.

SUMMARY OF THE INVENTION

In accordance with a first aspect of the present invention, there is provided an electric device for detecting pressure comprising: an electric current channel arranged to conduct an electric current, wherein the electric current channel is disposed adjacent or proximate to a pressure sensitive structure; and when upon the pressure sensitive structure is subjected to a change of an external pressure, the pressure sensitive structure is arranged to manipulate a first electrical characteristic of the electric current channel.

In an embodiment of the first aspect, the first electrical characteristic of the electric current channel is changed in response to a change of a second electrical characteristic of the pressure sensitive structure.

In an embodiment of the first aspect, the first electrical characteristic is an electrical resistance.

In an embodiment of the first aspect, the electric current channel is provided in a first layer of material, and the electric current is conducted through at least a portion of the first layer of material which defines the electric current channel.

In an embodiment of the first aspect, the first layer of material includes a semiconductor material.

In an embodiment of the first aspect, the first layer of material includes at least one of an organic semiconductor material and an oxide-based semiconductor material.

In an embodiment of the first aspect, the electric device further comprises at least two electrodes disposed on the first layer of material, wherein the at least two electrodes arranged to facilitate an electrical connection between the electric current channel and an electric current source.

In an embodiment of the first aspect, the at least two electrodes are further arranged to define a source terminal and a drain terminal of a transistor structure.

In an embodiment of the first aspect, the second electrical characteristic is an electrical capacitance.

In an embodiment of the first aspect, the pressure sensitive structure comprises a second layer of material with the electrical capacitance.

In an embodiment of the first aspect, the second layer of material includes a dielectric material.

In an embodiment of the first aspect, the second layer of material includes at least one of a polymeric filling and air.

In an embodiment of the first aspect, the electrical capacitance is changed according to a change of a thickness of the second layer of material.

In an embodiment of the first aspect, the pressure sensitive structure further comprises a third layer of material arranged to change the thickness of the second layer of material in response to the change of the external pressure subjected by the pressure sensitive structure.

In an embodiment of the first aspect, the third layer of material is flexible, and the third layer of material deforms at least partially so as to change the thickness of the second layer of material when upon the pressure sensitive structure is subjected to the change of external pressure.

In an embodiment of the first aspect, the pressure sensitive structure further comprises a spacer structure arranged to define a dimension of the second layer of material, and wherein the second layer of material is encapsulated by at least the spacer structure and the third layer of material.

In an embodiment of the first aspect, the spacer includes at least one of an adhesive tape and a layer of photoresist.

In an embodiment of the first aspect, the third layer of material includes an electric conductor material.

In an embodiment of the first aspect, the third layer of material includes at least one of a film of aluminum and a polymeric film with a coating of conductive material.

In an embodiment of the first aspect, the pressure sensitive structure is further arranged to define a gate terminal of a transistor structure.

In an embodiment of the first aspect, the electric device further comprises an insulating layer deposited on a first side of a substrate, wherein a first layer of material defining the electric current channel is disposed on the insulating layer and the pressure sensitive structure is disposed on a second side opposite to the first side of the substrate.

In an embodiment of the first aspect, the insulating layer includes at least one of a polymeric material and a metal-oxide material.

In accordance with a second aspect of the present invention, there is provided a method of fabricating an electric device for detecting pressure in accordance with the first aspect, comprising the steps of: providing a first layer of material arranged to define the electric current channel on a first side of a substrate; and providing the pressure sensitive structure on a second side opposite to the first side of the substrate.

In an embodiment of the second aspect, the step of providing the first layer of material on the first side of the substrate includes the steps of depositing an insulating layer on the first side of the substrate; and depositing the first layer of material on the insulating layer.

In an embodiment of the second aspect, the method further comprises the step of depositing at least two electrodes on the first layer of material.

In an embodiment of the second aspect, the step of providing the pressure sensitive structure on the second side of the substrate includes the steps of: depositing a spacer structure on the second side of the substrate; and attaching a third layer of material on the spacer structure so as to encapsulate a second layer of material between the third layer of material and the substrate.

In accordance with a second aspect of the present invention, there is provided a pressure sensor comprising: at least one electric device for detecting pressure in accordance with the first aspect; and an electric current source in electrical connection with the electric current channel of each of the at least one electric device; wherein a detection of the change of the external pressure is represented by a measurement result of an electrical resistance of the electric current channel.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised sensors with pressure and temperature sensing capabilities which are essential features for the next generation intelligent products. Flexible, low-cost, and low-voltage devices are of vital importance to satisfy the urgent requirements of many artificial intelligence applications. For example, organic thin film transistor, distinguished by their excellent flexibility and low-cost, may be used as organic devices in applications of integrated smart systems.

Some pressure sensors may not be good candidates for use in daily applications where cheap and disposable sensors are necessary. Therefore, a low cost solution for pressure sensing may be advantageous. For example, thin film transistor based pressure sensors may be used due to its high sensitivity and simple device fabrication process. These devices may be printed in large areas so as to reduce the fabrication cost.

Figure 1:
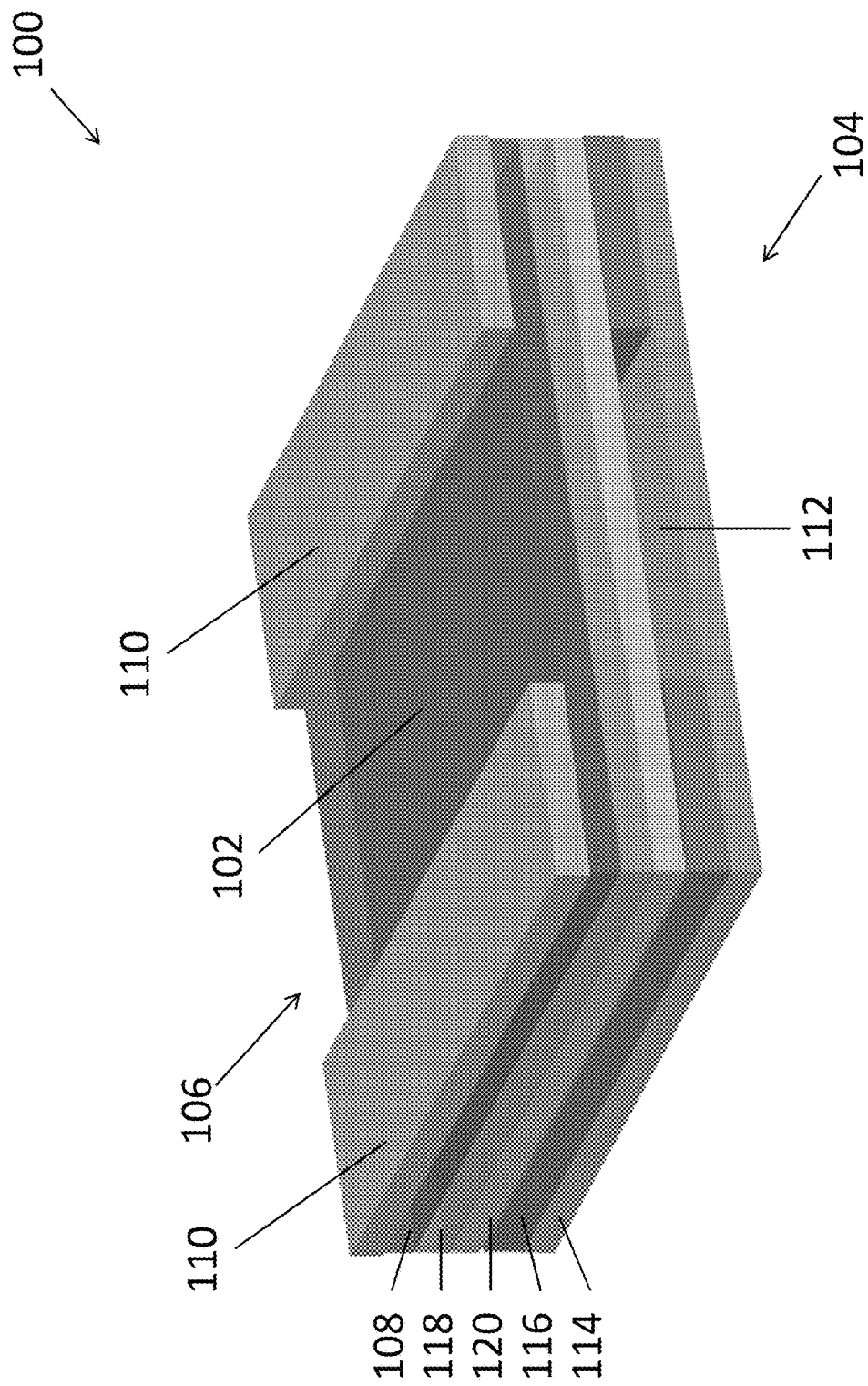
FIG. 1 is a perspective view of an electric device in accordance with one embodiment of the present invention.

With reference to FIG. 1, there is shown an example embodiment of an electric device 100 for detecting pressure comprising: an electric current channel 102 arranged to conduct an electric current, wherein the electric current channel 102 is disposed adjacent or proximate to a pressure sensitive structure 104; and when upon the pressure sensitive structure 104 is subjected to a change of an external pressure, the pressure sensitive structure 104 is arranged to manipulate a first electrical characteristic of the electric current channel 102.

In this embodiment, the electric device 100 includes a transistor structure 106 and a pressure sensitive structure 104, and the electrical characteristic of the transistor structure 106 may be affected by a pressure of the ambient that the electric device 100 is exposed to, such that the electric device 100 may be used as a pressure sensor. Preferably, the electric device 100 comprises a first layer of material 108 such as a semiconductor material. Such semiconductor layer 108 may be included as an active layer of the transistor structure 106, which defines the electric current channel 102 of the transistor structure 106 therein.

Preferably, the first layer of material 108 includes at least a semiconductor material, such as but not limited to, an organic semiconductor material (e.g. pentacene and Poly(3-hexylthiophene-2,5-diyl) regioregular (P3HT)), an oxide-based semiconductor material (e.g. ZnO and IGZO), other common semiconductor material (such as silicon, graphene, germanium and compound semiconductor etc.) may also be included in the transistor structure 106.

As appreciated by a skilled person, the electrical characteristic of the electric current channel of a transistor may be further manipulated by the gate and/or the source/drain terminals during different electrical operating conditions. For example, the electric current channel 102 of the transistor structure 106 includes a first electrical characteristic which is the electrical resistance of the channel 102, and the electrical resistance of the channel 102 may be affected or varied based on different operating conditions, such as different applied voltage biases.

Preferably, the electric current may be conducted through at least a portion of the semiconductor layer 108. This defines the electric current channel 102 of the electric device 100. In addition, the electric device 100 further comprises at least two electrodes 110 110 for facilitating the electrical connection between the electric current channel 102 and an electric current source (or a source for applying suitable electrical voltage bias to the transistor structure 106). For example, the electrodes 110 may be metal pads or strips provided on the semiconductor layer 108 such that electric current may be conducted through the electrodes 110 and the current channel 102 between the electrodes 110. The electrodes 110 may also define the source terminal and the drain terminal of the transistor structure 106. Preferably, the electrodes 110 include an electrically conductive material of aluminium, gold, copper, silver and/or a conductive metal oxide.

To manipulate the electrical resistance (or the transconductance) of the electric current channel 102 of the transistor structure 106, a pressure sensitive structure 104, which defines the gate terminal of the transistor structure 106, is disposed adjacent or proximate to the semiconductor layer 108 where the electric current channel 102 is defined therein. In such configuration, the electrical resistance of the channel 102 is changed or affected in response to a change of an electrical capacitance of the pressure sensitive structure 104 (a second electrical characteristic of the electric device 100).

With reference to FIG. 1, the pressure sensitive structure 104 comprises a second layer of material 112 with an electrical capacitance. Preferably, the second layer of material 112 includes a dielectric layer 112, such as but not limited a polymeric (such as PVDF) filling in form of (nano-)particles or nanowires, a fluid or air.

Preferably, the second layer of material 112 includes a flexible thickness such that the electrical capacitance is changed according to a change in the thickness of the second layer of material 112. For example, the electrical capacitance of the pressure sensitive structure 104 may increase when the thickness of the second layer of material 112 is decreased.

In this embodiment, the pressure sensitive structure 104 also comprises a third layer of material 114 adjacent to the second layer of material 112. Preferably, the third layer of material 114 is flexible and includes an electric conductor material such as a film of aluminium and a polymeric film (PET) with a coating of conductive material (ITO). This flexible film 114 may deform at least partially subject to a pressure difference between the second layer of material 112 and the ambient, so as to change the thickness of the second layer of material 112 when upon the pressure sensitive structure 104 is subjected to the change of external pressure.

The pressure sensitive structure 104 further comprises a spacer structure 116 arranged to define a dimension of the second layer of material 112, which includes dimensions such as the thickness and the shape (layout) of the dielectric layer 112. The spacer structure 116 may also cooperate with the flexible film 114 and the backside of the transistor structure 106 so as to encapsulate the dielectric layer 112, such that the volume (thickness) of the dielectric layer 112 may change in response to a change in external pressure.

According to different fabrication process of the electric device 100, the spacer structure 116 may include at least one of an adhesive tape and a layer of photoresist. In addition, the electric device 100 may further comprise an insulating layer 118 and a substrate 120, wherein the insulating layer 118 is deposited on a first side of the substrate 120 with the semiconductor layer 108 (first layer of material 108) disposed on the insulating layer 118 and the pressure sensitive structure 104 disposed on a second side (the opposite side of the first side) of the substrate 120.

Preferably, the insulating layer 118 includes at least one of a polymeric material (such as PS, PMMA or PVDF) and a metal-oxide material (such as $HfO_2$, $Al_2O_3$). The substrate 120 may be a common substrate such as PET, PI, Si, Glass or metal foil.

Figure 2:
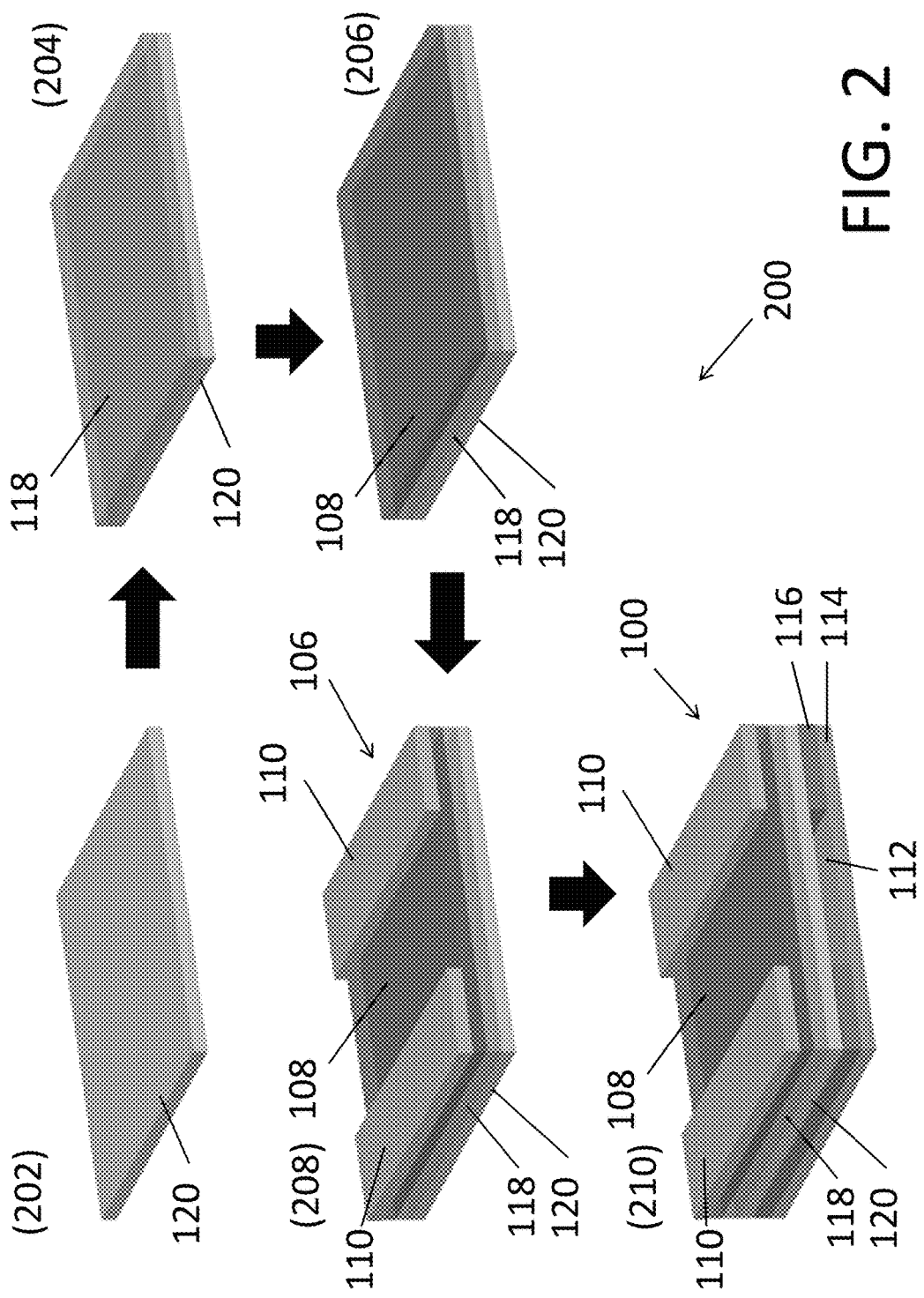
FIG. 2 is an illustration showing a process flow of a fabrication of the electric device of FIG. 1.

With reference to FIG. 2, there is shown an example embodiment of a method of fabricating an electric device 100 for detecting pressure, comprising the steps of: providing a first layer of material 108 arranged to define the electric current channel 102 on a first side of a substrate 120; and providing the pressure sensitive structure 104 on a second side opposite to the first side of the substrate 120.

In this example, the entire fabrication process 200 of the electric device 100 starts with step 202, in which a substrate 120 is cleaned and dried, preferably in oven at 110° C., any other suitable drying process may be applied additionally or alternatively.

In step 204, an insulating layer 118 is deposited on the first side of the substrate 120. For example, a dielectric layer 112 may be deposited using solution-processing methods for the polymers and some metal oxide dielectrics. Some other types of dielectric layer (such as $Al_2O_3$ and $HfO_2$) could also be deposited by atomic layer deposition (ALD) sputtering, or chemical vapour deposition (CVD).

In step 206, the first layer of material or the semiconductor layer 108 may be deposited on the insulating layer 118. In some example embodiments, polymeric semiconductors may be deposited by solution-processing method, the small molecular semiconductor may be deposited by thermal evaporation, and metal oxide semiconductors may be deposited by solution-processing or sputtering on the insulating layer 118.

In step 208, at least two electrodes 110 are deposited on the semiconductor layer 108, which may form the source and drain electrodes/terminals, by using thermal evaporation or any other deposition methods.

Optionally, the electric device 100 may be enhanced by fabrication process such as annealing or SAM which modify the interface between the semiconductor layer 108 and the dielectric layer 112 so as to form a better electric current channel 102 in the transistor structure 106. In addition, annealing may also be applied to repair the traps in the device 100 to enhance the performance of the pressure sensing detection.

In step 210, the pressure sensitive structure 104 is provided on the second side of the substrate 120. Firstly, a spacer structure 116 is formed on the backside of the substrate 120. This may be achieved by attaching adhesive tapes on the backside of the substrate 120 to define the spacer structure 116. Alternatively, photoresist may be applied on the backside of the substrate 120 by spin-coating followed by standard patterning procedures used in photolithography. Secondly, the third layer of material 114 is attached to the spacer structure 116 (using adhesives) to encapsulate the second layer of material 112 (air or fillings) in the cavity defined by the spacer structure 116 and between the third layer of material 114 and the substrate 120.

Preferably, different layers of the electric device 100 may include the following ranges of thickness. For example, the substrate 120 may include a thickness of 10-500 μm, the insulating layer 118 may include a thickness of 10-300 nm, the semiconductor layer 108 may include a thickness of 10-100 nm, the electrodes 110 may include a thickness of 30-100 nm, the spacer structure 116 may include a thickness of 100 nm-100 μm, and the flexible film 114 or the gate electrode may include a thickness of 10-300 μm. The thicknesses of different layers may be selected based on a number of considerations, including but not limited to fabrication process, quality of layers of material formed and sensitivity and operating performance of the electric device 100.

Figure 3:
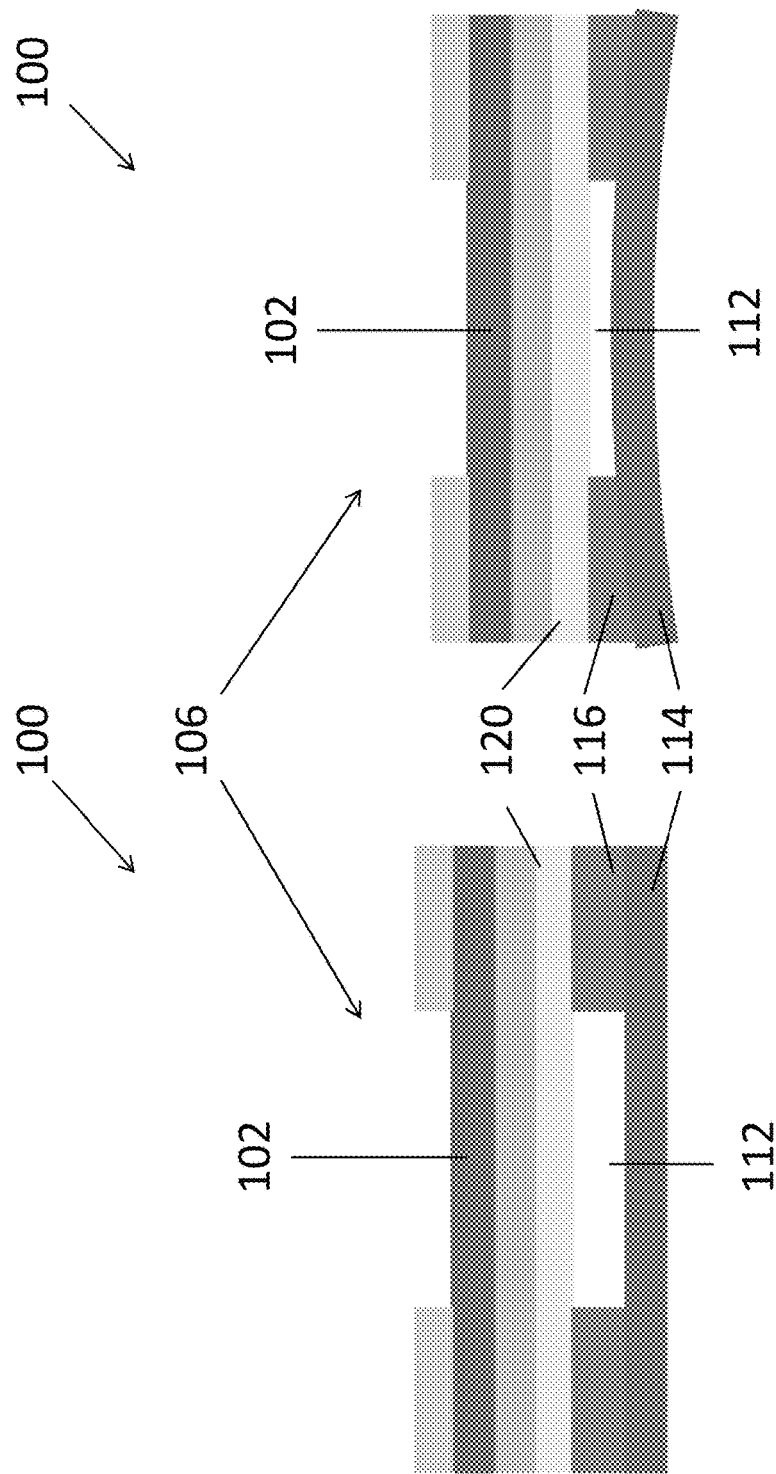
FIG. 3A is an illustration of an operation of an electric device of FIG. 1 subjected to a first external pressure.
FIG. 3B is an illustration of an operation of an electric device of FIG. 1 subjected to a second external pressure.

The operations of the electric device 100 are illustrated in FIGS. 3A and 3B. For example, the sensing gate or the flexible film 114 may remain flatten (as shown in FIG. 3A) when the electric device 100 is subjected an external pressure equal to the internal pressure of the air gap 112 encapsulated as fabricated. When upon the pressure sensitive structure 104 is subjected to an increase of the external pressure, the pressure difference force the flexible film 114 to deform and shrink the thickness (or volume) of the encapsulated air gap 112 so as to reach an equilibrium between the internal and external pressures. In this configuration, the sensing gate has a higher electrical capacitance than when the flexible film 114 remains flatten due to the reduced thickness of the air gap 112, and in turn affecting the electric current channel 102 in the adjacent or proximate transistor structure 106.

During operation, the electric device 100 may be exposed to an external pressure to be tested, such as an air pressure in the atmosphere. Voltage bias may be applied to the gate/drain/source terminals and current values of the current conducted by the channel 102 may be measured, and the measurement may be similar to the characterization of an electronic transistor.

In addition, the measured current-voltage characteristics may also represent a change of temperature when compared to a predetermined/calibrated current and/or voltage values under certain biasing conditions. For example, there exists some trap states at the interface of semiconductor layer 108 and insulating layer 118, which may be characterized by determining the threshold (turn-on) voltage ($V_{TH}$) of transistor structure 106.

The density of the charges trapped in the trap states is in close relation to the temperature according to a multiple trapping and release mode. Thus, when temperature decreases, more and more charges are trapped, this results in a large $V_{TH}$ of the transistor structure 106. Alternatively, more trapped charges may escape from the trap sites when the temperature increase, therefore a smaller $V_{TH}$ may be obtained.

Figure 4:
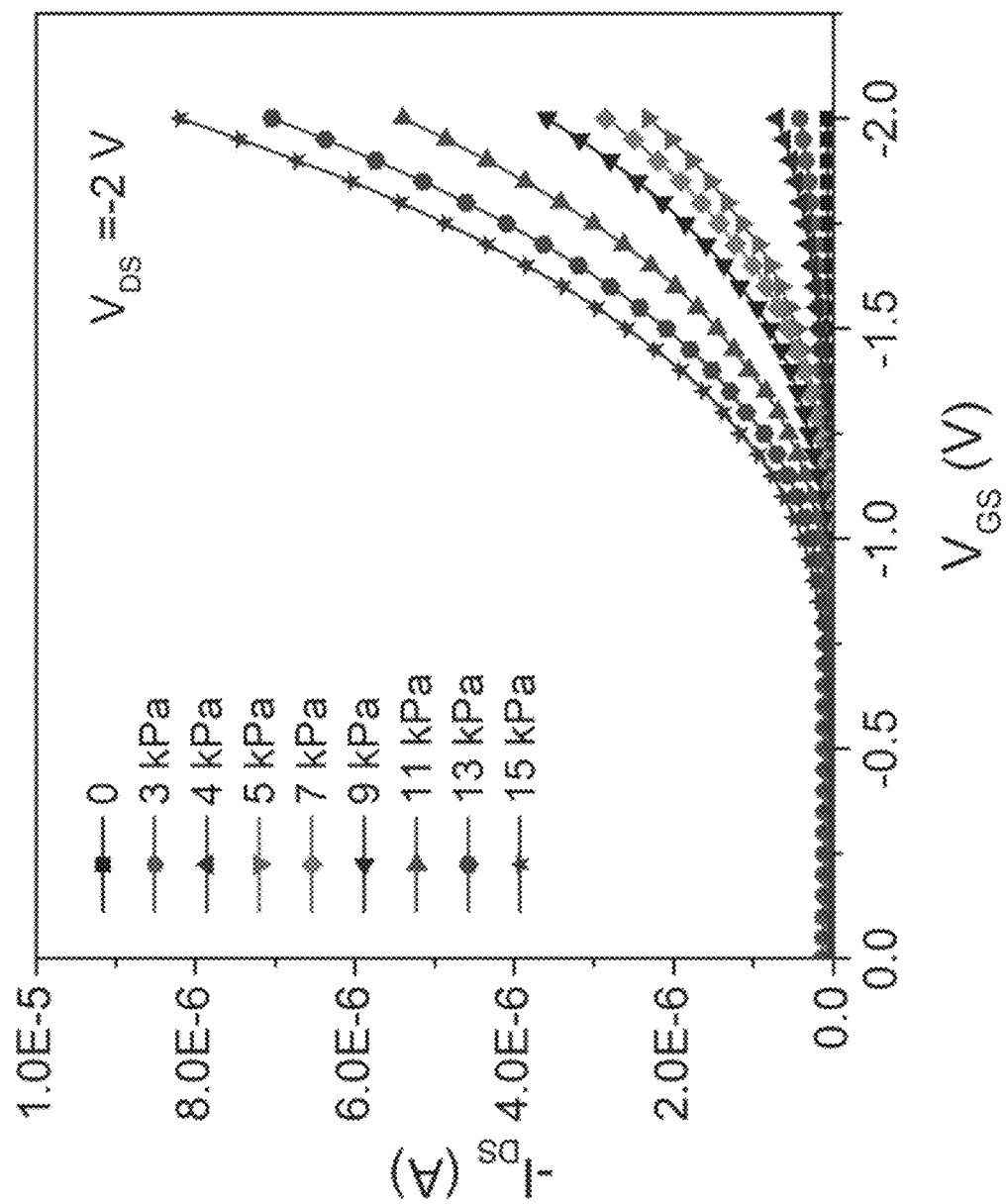
FIG. 4 is a plot showing an I-V characteristic of the electric device of FIG. 1 subjected to different external pressure and voltage bias applied to the source/drain/gate terminals.

With reference to FIG. 4, it is shown that under a same gate-to-source voltage bias (such as −2.0 V) and a same drain-to-source voltage bias (such as −2 V), the current $I_{DS}$ conducted by the channel 102 increases with the increase in the external pressure subjected by the pressure sensitive structure 104. Therefore, the electric device 100 may be used as a pressure sensor which may comprise an electric device 100 for detecting pressure in accordance with the previous embodiments as discussed and an electric current source in electrical connection with the electric current channels 102, and the measurement result of the electrical resistance of the electric current channel 102 (or the I-V characteristic of the transistor structure 106) may represent a detection of a change of the external pressure. In addition, the pressure sensor may be calibrated to represent different values of external pressure of the testing ambient.

Optionally, the pressure sensor may comprise multiple electric devices 100 for detecting pressure in an array so as to monitor or detect pressure in multiple locations or testing points.

These embodiments are advantageous in that the electric device may be fabricated using simple and low-cost methods including printing, solution processing technologies. The as fabricated pressure sensor may be driven by low voltage (0 to ±5 V) and power, and with a wide operation range of a detection of pressure between 1 kPa to 20 kPa (down to several Pa).

Advantageously, the electric device may be operable to detect a change in temperature by measuring the change in output current-voltage characteristics obtained. The electric device may be implemented as a standalone temperature sensor, or a pressure sensor with a temperature sensing feature. This may eliminate the use of a separate temperature sensor in an electric sensing apparatus.

It may be also advantageous in that the electric device may be readily scalable with the solution process involve in its fabrication, for example, printing technologies may be applied in fabricating large amount of electric device in accordance with the embodiments of the present invention or devices with different size may be easily fabricated using the simple fabrication process involved.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electric device for detecting pressure, comprising: a substrate; an electric current channel disposed on one side of the substrate, arranged to conduct an electric current; and a pressure sensitive structure disposed on the other side of the substrate, arranged to manipulate a first electrical characteristic of the electric current channel; wherein the pressure sensitive structure comprises a spacer structure and is subjected to a change in external pressure.

2. The electric device in accordance with claim 1, wherein the first electrical characteristic of the electric current channel varies in response to a second electrical characteristic of the pressure sensitive structure.

3. The electric device in accordance with claim 1, wherein the first electrical characteristic is an electrical resistance.

4. The electric device in accordance with claim 3, wherein the electric current channel is defined by a first layer of material, and the electric current is conducted through at least a portion of the first layer of material.

5. The electric device in accordance with claim 4, wherein the first layer of material includes a semiconductor material.

6. The electric device in accordance with claim 5, wherein the first layer of material includes at least one of an organic semiconductor material and an oxide-based semiconductor material.

7. The electric device in accordance with claim 4, further comprises at least two electrodes disposed on the first layer of material, wherein the at least two electrodes arranged to facilitate an electrical connection between the electric current channel and an electric current source.

8. The electric device in accordance with claim 7, wherein the at least two electrodes are further arranged to define a source terminal and a drain terminal of a transistor structure.

9. The electric device in accordance with claim 2, wherein the pressure sensitive structure comprises a second layer of material with the second electrical characteristic.

10. The electric device in accordance with claim 9, wherein the second electrical characteristic is an electrical capacitance.

11. The electric device in accordance with claim 10, wherein the second layer of material includes a dielectric material.

12. The electric device in accordance with claim 11, wherein the second layer of material includes at least one of a polymeric filling and air.

13. The electric device in accordance with claim 10, wherein the electrical capacitance varies with a thickness of the second layer of material.

14. The electric device in accordance with claim 13, wherein the pressure sensitive structure further comprises a third layer of material arranged to change the thickness of the second layer of material in response to the change in external pressure subjected by the pressure sensitive structure.

15. The electric device in accordance with claim 14, wherein the third layer of material is flexible, and the third layer of material deforms at least partially so as to change the thickness of the second layer of material when upon the pressure sensitive structure is subjected to the change in external pressure.

16. The electric device in accordance with claim 15, wherein the spacer structure is arranged to define a dimension of the second layer of material, and wherein the second layer of material is encapsulated by at least the spacer structure and the third layer of material.

17. The electric device in accordance with claim 16, wherein the spacer structure includes at least one of an adhesive tape and a layer of photoresist.

18. The electric device in accordance with claim 14, wherein the third layer of material includes an electric conductor material.

19. The electric device in accordance with claim 18, wherein the third layer of material includes at least one of a film of aluminum and a polymeric film with a coating of conductive material.

20. The electric device in accordance with claim 9, wherein the pressure sensitive structure is further arranged to define a gate terminal of a transistor structure.

21. The electric device in accordance with claim 1, further comprising an insulating layer deposited between the substrate and the electric current channel.

22. The electric device in accordance with claim 21, wherein the insulating layer includes at least one of a polymeric material and a metal-oxide material.

23. A pressure sensor comprising:
at least one electric device for detecting pressure in accordance with claim 1; and
an electric current source in electrical connection with an electric current channel of each of the at least one electric device;
wherein a detection of the change in external pressure is represented by a measurement result of an electrical resistance of the electric current channel.

* * * * *